INVENTORS:
ORVILLE MITCHELL
WILLIAM P. FREEMAN, JR.
By Kingsland, Rogers & Ezell
ATTORNEYS

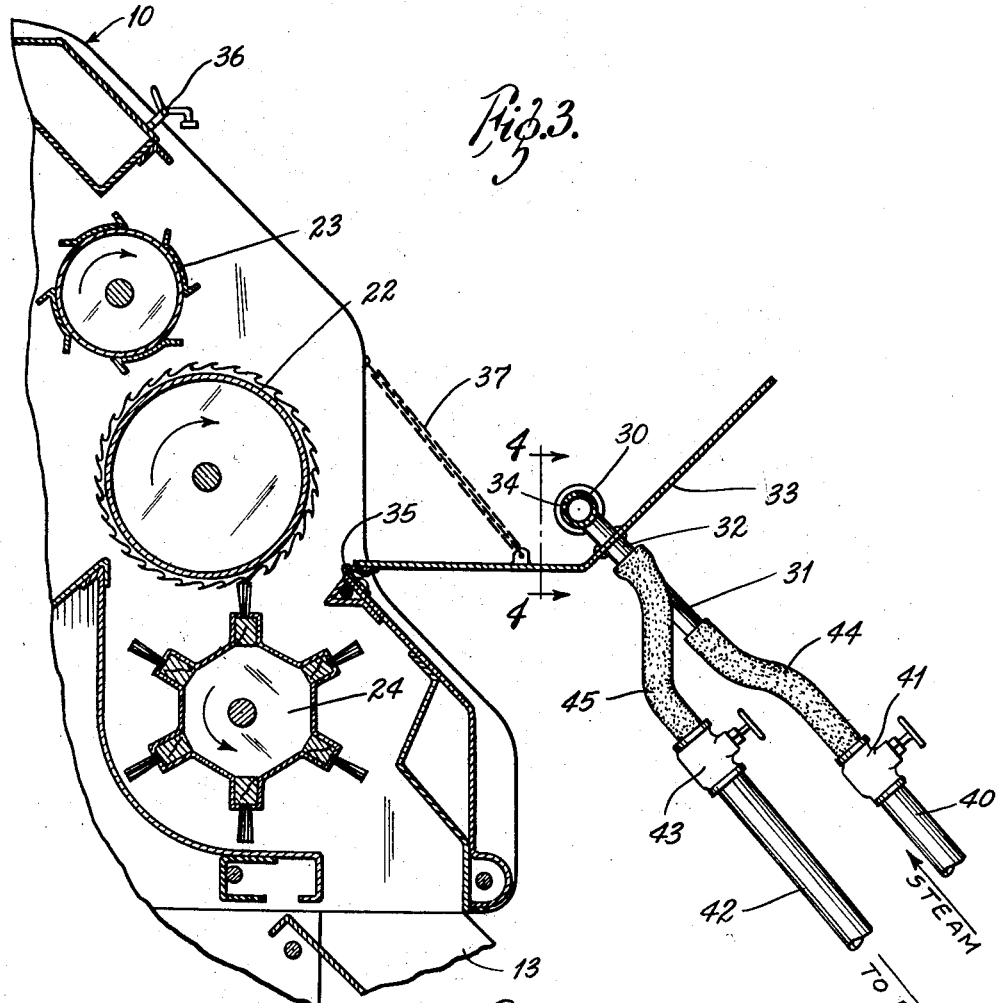
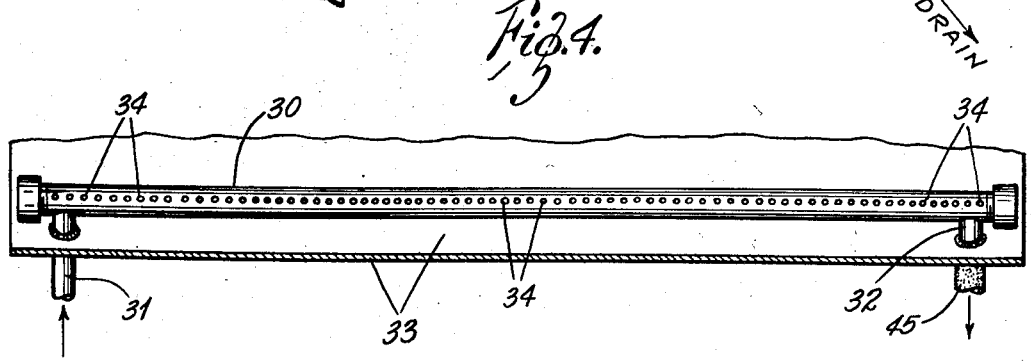

United States Patent Office 2,867,851
Patented Jan. 13, 1959

2,867,851

APPARATUS FOR HUMIDIFYING SEED COTTON

Orville Mitchell and William P. Freeman, Jr., Dallas, Tex., assignors to John E. Mitchell Company, Dallas, Tex., a corporation of Missouri Application March 12, 1952, Serial No. 276,207

4 Claims. (Cl. 19—66)

This invention relates to a method and apparatus for humidifying cotton. In particular, it is drawn to the improvement of providing means for humidifying seed cotton so as to increase the moisture content of cleaned cotton before delivering it to the gin.

In present day practice, it is conventional to harvest cotton mechanically, and in such operations the raw cotton so gathered is intermingled with cotton hulls and trash comprising leaves, twigs and other impurities. Such raw cotton must first be cleaned before delivering it to the gin for the ultimate ginning operation; and it is quite advantageous to dry the cotton at the time of or prior to cleaning so that the foreign matter—particularly the leaf trash—can more easily be separated from the cotton. However, although the cotton may be more easily cleaned in such dry condition, that condition is itself disadvantageous for certain reasons.

First of all, in the cleaning operation the concomitant drying operation sometimes shortens the fiber length to the detriment of the value of the cotton. Cotton fibers of higher moisture content than that which results from the combined drying and cleaning action, especially when the drying action is excessively severe, have a greater fiber length and other qualties which render the cotton more valuable in its ultimate use. Further, the optimum moisture content for cleaning is lower than the optimum moisture content for ginning. Hence, the previously-mentioned drying action often will have reduced the moisture content to considerably below that desirable for good ginning.

In the conventional cleaning operations, it is the normal procedure to reduce the moisture content from as high as fifteen percent in raw cotton to the neighborhood of four percent or five percent by means of introducing hot air at an appropriate point in the cotton processing system, at a temperature in the neighborhood of 200° F. Normally, the hot air is reduced to a temperature in the neighborhood of 100° F. when it leaves the cleaning machine as a result of vaporizing a portion of the moisture in the cotton. The cleaners if adequate are able to separate out the trash quite readily from cotton with only four to five percent moisture.

Yet, although for easiest cleaning the cotton should be dry, with about four percent or five percent moisture, for the most effective ginning, it is required that the clean cotton have a moisture content in the neighborhood of eight percent or ten percent. Accordingly, this invention contemplates a method and apparatus for restoring a part of the moisture to the cleaned cotton at the exit end of the cotton cleaner before the cleaned cotton is introduced to the gin. Further, by restoring a portion of the moisture content lost in the drying and cleaning operation, reduction in the fiber length, which may be as much as $\frac{1}{32}$ of an inch or $\frac{1}{16}$ of an inch, can be restored.

Accordingly, it is an object of this invention to provide a method and apparatus for providing relatively dry cotton for cleaning, but relatively moist cotton for ginning and for delivery from the gin.

Specifically, it is a further object of this invention to provide a method and apparatus for humidifying dried cotton as it leaves a cotton conditioning machine and before it is introduced to the gin. Another object is to supply moisture to the cotton while it is in a thin, spread-out stream; and specifically, while the cotton is on the saw cylinder of the feeder-extractor-cleaner machine, immediately preceding the gin stand.

A further specific object of the invention is to provide an arrangement for injecting steam into the cotton in a feeder-extractor-cleaner, in coordination with the application of hot air for drying the cotton in the machine, so that the parts of the machine are sufficiently heated, when the steam is directed into them, that no condensation problem arises.

A still further object of this invention is to provide apparatus for humidifying dried and cleaned cotton in a cotton conditioning machine which comprises a steam manifold that is adapted to supply steam to one of the cotton extracting cylinders in the cotton cleaning machine and which can be moved out of operative contact with the cotton cleaning machine.

Other objects of this invention will appear in part from the detailed description given below and will further be obvious to those skilled in the art.

In these drawings:

Fig. 3 is a sectional view similar to Fig. 2 but showing the humidifying apparatus swung away and out of contact with the cotton cleaning machine; and Fig. 4 is a section on line 4—4 of Fig. 3 showing the steam manifold of the humidifying apparatus in detail.

Figure 1:
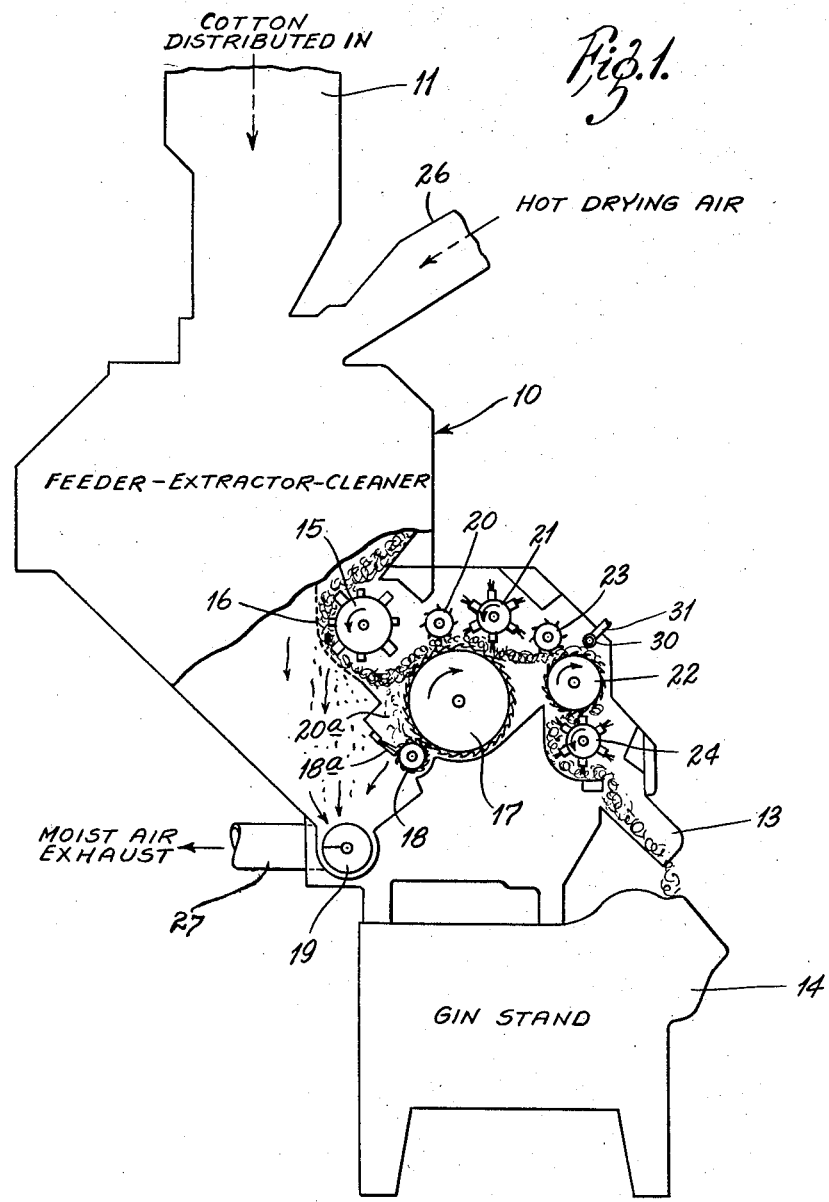
Fig. 1 is a somewhat diagrammatical view, partly broken away, of certain cotton conditioning machinery superposed over a gin stand, to illustrate the applicability of the present invention.

In Fig. 1, a well-known arrangement of cotton house machinery is shown, with the understanding that this choice of machinery is, in certain broader aspects of this invention, purely illustrative. The illustrated machine comprises a feeder-extractor-cleaner (or F-E-C) machine 10, into which cotton is delivered at 11 by a suitable distributor (not detailed), and from which cotton is delivered at 13 to a gin 14.

In the F-E-C machine 10 here illustrated, the initially trashy cotton passes through certain cleaning devices (not detailed) and then is delivered by a directing cylinder 15, over a screen 16, onto a saw cylinder 17. Small trash escapes through the screen 16 into the trash conveyor 19 and is withdrawn from the machine. Meanwhile, the cotton, with hulls and other large trash, is thrown by the directing cylinder 15 against the upgoing side of the saw cylinder 17. The locks of cotton impinge upon the saw cylinder and are impaled upon the saw teeth. As the locks of cotton are carried by the saw cylinder under the kicker roller 20, the loose hulls, stems and other foreign matter are kicked back by this kicker roller 20, which runs in a direction opposite to the saw cylinder 17. The hulls and other foreign matter thus kicked back pass downwardly through the gap 20a between the hullboard and the saw cylinder 17 and into contact with reclaiming saw cylinder 18. The reclaiming saw cylinder 18 carries the hulls under the steel wire brush 18a, whence they fall into the trash conveyor 19 and are taken out of the machine. Any locks of cotton falling with the hulls onto the reclaimer saw 18 are engaged by the teeth of the reclaiming saw and are carried around into contact with the teeth of the main saw cylinder 17, which, traveling at a higher peripheral speed, doffs the cotton off the smaller saw, and reclaims or saves it. This reclaimed cotton joins the main cotton stream and is carried under the kicker roller 20.

The cotton stream is removed from the teeth of the saw cylinder 17 by the doffer 21 and directed onto the saw cylinder 22 which carries it under the kicker roller 23 for a recleaning process. The doffer 24 sweeps the cotton off the saw 22 and delivers it into the discharge chute 13 for descent into the gin 14.

As previously stated, cotton cleans readily if the moisture content is reduced to about four to five percent. This may be accomplished by one of several known ways, such as bulk driers, exemplified by tower driers and conveyor driers usually located between the separator and distributor, or by the method here illustrated which is a combination of a drier with the F–E–C machine. Sometimes a bulk drier is used in addition to the combination drier. In every case, hot air is supplied to the cotton to dry it at or prior to the final cleaning operations.

In the illustrated arrangement, hot, drying air is introduced into the F–E–C machine at 26, adjacent to where the cotton is distributed into that machine. A moist air exhaust blower pipe 27 is connected into the machine 10 at or adjacent to the trash outlet conveyor 19. The heated air is thereby drawn through the stream of cotton in the machine 10 to dry the same to the required upper limit of four to five percent prior to the final cleaning operation. By such arrangement (or by one of the other known arrangements) the cotton may be made adequately and desirably dry for being cleaned.

However, cotton so dry is not so good for ginning as previously stated. The present invention provides an arrangement for resupplying the dried cotton with an appropriate amount of moisture, between the final cleaning in the F–E–C machine 10 and the gin 14.

The humidifying apparatus comprises a steam manifold 30 having a steam inlet 31 at one end and a drain outlet 32 at its other end. The inlet 31 and outlet 32, which extend through a hinged door or panel 33, may be welded or otherwise secured to the panel 33 so as to support the manifold 30 thereon. The manifold 30 has a series of steam outlet holes 34 along its length.

The panel 33, which is hinged at its lower edge, at 35, to the F–E–C housing, can be locked in closed position shown in Fig. 1 by means of a latch 36. In the open position, the panel 33 is limited by chains 37 attached between the housing of the machine 10 and the hinged panel 33.

A steam line 40 is connected to the manifold inlet pipe 31 and is provided with a valve 41. A drain conduit 42 is connected to the manifold outlet pipe 32 and is provided with a valve 43. Flexible connectors 44 and 45 may be used to attach the steam pipe 40 and the drain pipe 41, respectively, to the inlet and outlet pipes 31 and 32, on the movable door panel 33.

Figure 2:
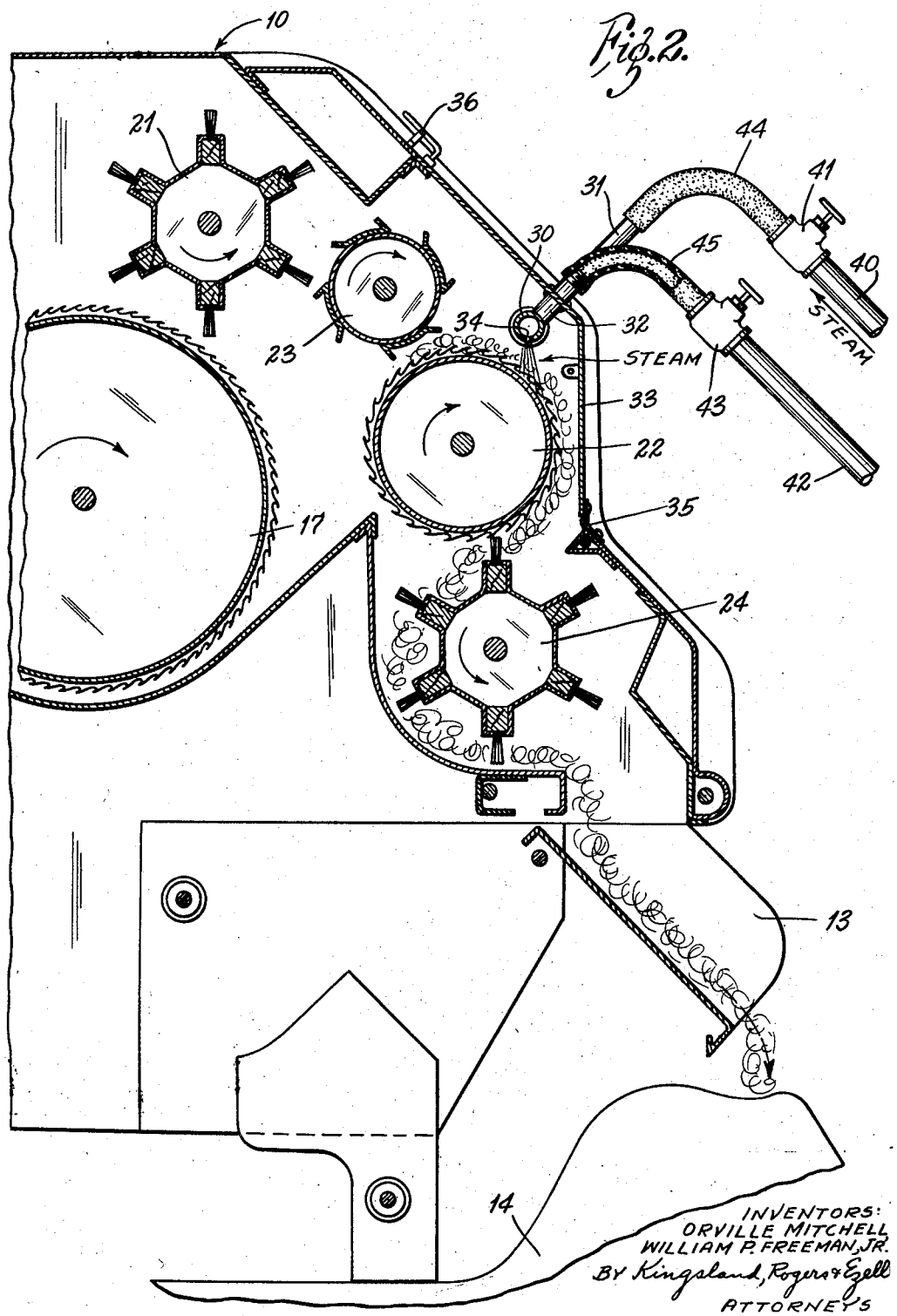
Fig. 2 is an enlarged sectional view through a portion of a feeder-extractor-cleaner unit having the present invention associated therewith, in positions of use.

Upon inspection of Figs. 1 and 2, it can be seen that when the door panel 33 is closed the manifold openings 34 are along the bottom of the pipe 30, so as to direct steam downwardly against the right side of the saw cylinder 22; whereas when the door panel 33 is opened, as shown in Fig. 3, the openings 34 are well above the bottom of the manifold, and the drain connector 32 leads off from the lowest point of the manifold. The purpose of this disposition of the manifold will appear.

*Operation*

In carrying out the operation of the humidifying apparatus with the illustrated feeder-extractor-cleaner machine, trashy cotton is conventionally distributed into the F–E–C machine 10 operating either singly or as one of a battery of like machines. The over-all course of the cotton through the F–E–C machine is downward, although it will be understood that the cotton passes through various conditioning devices within the F–E–C machine that remove foreign materials from it, thus cleaning it of trash, hulls, leaves and the like, in stages. In Fig. 1, the partially cleaned cotton descends to the directing cylinder 15, which directs it across the screen 16 for removal of small trash there, which latter descends through the screen to the trash conveyor 19 and is withdrawn from the machine. The main cotton stream, with hulls and large trash, then is thrown against the teeth on the saw cylinder 17, the locks of cotton being impaled thereupon, and as they are carried by the saw cylinder under the kicker roller 20, the loose hulls, stems, and foreign matter are kicked back and descend through the gap or passage 20a, to the reclaiming saw cylinder 18. The saw 18 carries the hulls under the wire brush 18a, whence they fall into the trash conveyor 19. Any locks of cotton picked up by the saw 18 are carried around and doffed therefrom by the saw 17 and returned to the main cotton stream.

From the saw cylinder 17, which acts to remove hulls, sticks, etc., the cotton is doffed by the doffer 21 to the smaller saw cylinder 22 for a recleaning process. The kicker roll 23 operates to knock back hulls and other trash, which escape from the cotton stream by falling down through the space between the two saw cylinders, and thence to the reclaimer mechanism 18, by the lower side of saw cylinder 17.

As a desirable concomitant of the foregoing operation, heated air may be introduced, at a temperature in the neighborhood of 200° F., into the F–E–C housing at 26, so as to enter the housing with the raw cotton. This air travels concurrently with the cotton as it is cleaned, aiding in the cleaning operations, and also drying the cotton so as to facilitate separation of trash therefrom. The arrows in Fig. 1 show generally the path of air travel through the machine, and demonstrate that the drying air has substantially completed its work by the time the cotton leaves the large saw cylinder 17. By such time, the main part of the cleaning and separating is done.

Hence, the illustrated apparatus discloses a cotton feeding, extracting and cleaning operation in which the cotton is heated and dried during the extracting and cleaning. It is to be remembered, in connection with certain aspects of the present invention, that the drying of the cotton may be done otherwise, as in bulk driers. In any case, the cotton, having been dried to facilitate cleaning and extracting, has been rendered too dry for best ginning. It is to overcome this that the present humidifying system has been provided.

Assuming the F–E–C machine is just being put into operation, the humidifying apparatus will first be disposed in its non-operative position shown in Fig. 3, by opening the door panel 33 and swinging it to open position. Then the drain valve 43 is opened, so that any condensate which may be in the nozzle or manifold 30 can flow out through the drain pipe 32, which pipe is at the bottom point of the manifold when the door panel 33 is open. The steam line 40 to a boiler (not shown) is next opened by opening the valve 41, and steam will then enter the manifold 30 and escape through holes 34 therein. Because of the elevation of these holes 34 when the panel 33 is open, any water in the steam, or any condensate in the manifold at the beginning of this operation will drain through the condensate line 32—45—42. At the end of a short period of time, the water will all be drained out and only steam will be discharged from the holes 34 in the nozzle, so that the valve 43 in the condensate line 42 can then be closed.

In the meanwhile, the parts of the machine against which the steam will be directed can have been elevated in temperature to minimize condensation of the steam on such parts, by preheating with the hot air introduced at 26 and withdrawn at 27 after circulating over the parts of the machine. This type of coordination of the humidifying apparatus, and the drying means, is of course possible only where hot air is available for circulation through the machine 10.

After the condensation condition has been brought under control as aforesaid, and dry steam is emitting from the manifold ports 34, and where possible, the parts within the machine 10 have been heated, the door panel 33 is swung closed and latched. Then the cotton feed is started and the cotton passes through the machine as previously described.

The humidifying of the cotton takes place only at the stage of operation in the F–E–C machine 10 immediately prior to delivery to the gin. By the arrangement described, the steam is directed onto the cotton while the latter is in a shallow or thin, wide mass moving as a stream beneath the steam outlets. This provides for superior opportunity of intimate contact of steam with individual locks of the cotton impaled on the teeth of the saw cylinder, all the way across the machine. And the humidifying is accomplished without interfering with the normal flow of cotton through the conditioning machinery.

The humidifying may be stopped, or regulated, by use of the valve 41.

By virtue of the process and apparatus described, it has been made possible to retain the efficiency and advantages obtained in conventional cotton cleaning machines, which operate with a simultaneous drying of cotton, and at the same time humidify the cotton resulting from this cleaning action so that it can be introduced at an increased moisture content to the gin machine for a more efficient ginning action. Further, by means of this invention, the fiber length can be restored from the shortened length which was heretofore considered as a necessary result of the conventional dry cleaning process. It is obvious that certain modifications may be made in my process and apparatus as will appear to those skilled in the art, and accordingly, this invention is to be limited only by the scope of the attending claims.

What is claimed is:

1. In a cotton conditioning machine having means for causing cotton to flow in a stream, a housing through which the cotton can flow; a humidifying device for applying moisture to said stream of cotton, said device comprising a manifold with a series of steam discharge holes through a wall of said manifold, means for introducing steam into said manifold for discharge out of said manifold through the steam discharge holes, means for changing the position of said manifold from an operative humidifying position where the discharge holes will be disposed in a direction so as to discharge steam into contact with the stream of cotton to a non-humidifying position where said holes will be disposed away from said cotton and above the bottom of said manifold, and a drain for said manifold so situated that when said humidifying device is in said non-humidifying position, it is at the bottom of said manifold so that any condensate in the pipe will flow through said drain rather than through said manifold holes, said means for changing the position of said manifold comprising a portion of the housing wall to which the manifold is attached, the wall portion being hingedly attached to the said wall of said cotton conditioning machine, so that said portion of the housing member and the manifold can be moved from the operative humidifying position to said non-operative position.

2. In a cotton conditioning machine having means for causing cotton to flow in a stream, a humidifying device for applying moisture to said stream of cotton, said device comprising a manifold with a series of steam discharge holes through a wall of said manifold, means for introducing steam into said manifold for discharge out of said manifold through the steam discharge holes, means for withdrawing said manifold from the stream of cotton and displacing the manifold bodily to a non-humidifying position where said holes will be disposed away from said cotton and at the top portion of said manifold to prevent discharge of condensate through said discharge holes 3. In a cotton conditioning machine having means for causing cotton to flow in a stream, a humidifying device for applying moisture to said stream of cotton, said device comprising a housing, a manifold with a series of steam discharge holes through a wall of said manifold, means for introducing steam into said manifold for discharge out of said manifold through the steam discharge holes, means for changing the position of said manifold from an operative humidifying position where the discharge holes will be disposed in a direction so as to discharge steam into contact with the stream of cotton to a non-humidifying position where said holes will be disposed away from said cotton and at the top portion of said manifold to prevent discharge of condensate through said discharge holes, said means for changing the position of said manifold comprising a portion of the housing hingedly attached to a wall of the housing of said cotton conditioning machine, the manifold being secured to the said housing portion so that said housing member can be moved from the operative humidifying position to said non-operative position.

4. In cotton cleaning and ginning apparatus, a housing, mechanism in the housing having cotton-cleaning devices therein for cleaning seed cotton prior to ginning, of leaf-trash and the like; means in the cleaning mechanism for applying heat to cotton to expel moisture from it, means directing it to cleaning devices in the cleaning mechanism; means to deliver the cleaned cotton in a stream to the gin; and rehumidifying means disposed between the end of the cleaning devices and the delivery of the cotton to the gin, to re-humidify it, the re-humidifying means comprising means extending across the cleaned cotton stream to discharge vapor against the stream; mounting means for the vapor discharge elements including part of a housing for the cleaning mechanism, and hinging means to move the mounting means to direct the vapor discharge away from the cotton.

References Cited in the file of this patent

UNITED STATES PATENTS

| 227,767 | Groom | May 18, 1880 |
| 1,053,802 | Fletcher | Feb. 18, 1913 |
| 1,460,519 | Wadsworth | July 3, 1923 |
| 1,461,393 | Jenkinson | July 10, 1923 |
| 1,520,187 | Lawson | Dec. 23, 1924 |
| 1,642,982 | Willis | Sept. 20, 1927 |
| 1,827,183 | Bennett | Oct. 13, 1931 |
| 1,954,383 | Herring | Apr. 10, 1934 |
| 1,962,320 | Mitchell | June 12, 1934 |
| 2,158,752 | Fowler | May 16, 1939 |
| 2,219,402 | Sanders | Oct. 29, 1940 |